US012493221B1

(12) United States Patent
Choo et al.

(10) Patent No.: US 12,493,221 B1
(45) Date of Patent: Dec. 9, 2025

(54) METHOD OF FORMING A SPATIAL LIGHT MODULATOR (71) Applicant: II-VI Delaware, Inc., Wilmington, DE (US)

(72) Inventors: Wei Chien Choo, Rosebery (AU); Nitesh Gulati, Rosebery (AU); Glenn Wayne Baxter, Hornsby Heights (AU); Er-Chien Wang, Canberra (AU)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

(21) Appl. No.: 18/792,331

(22) Filed: Aug. 1, 2024

(51) Int. Cl.
*G02F 1/1362* (2006.01)
*G02F 1/1333* (2006.01)
*G02F 1/1339* (2006.01)
*G02F 1/1341* (2006.01)

(52) U.S. Cl.
CPC .. *G02F 1/136277* (2013.01); *G02F 1/133354* (2021.01); *G02F 1/1339* (2013.01); *G02F 1/1341* (2013.01)

(58) Field of Classification Search
CPC ......... G02F 1/136277; G02F 1/133354; G02F 1/1339; G02F 1/1341
See application file for complete search history.

(56) References Cited

U.S. PATENT DOCUMENTS 6,191,841 B1 * 2/2001 Ootaguro .............. G02F 1/1341
349/190
2021/0208321 A1 * 7/2021 Takahashi ............ G02B 5/3016

* cited by examiner

*Primary Examiner* — Anne M Hines
(74) *Attorney, Agent, or Firm* — Blank Rome LLP (57) ABSTRACT

Described herein is a method (400) of forming a spatial light modulator device (100). The method (400) comprises, at step (401), providing a planar silicon substrate. At step (403), a patternable material (508) is deposited onto a bonding surface (506) of the silicon substrate (502). At step (404), the patternable material (508) is formed into a predefined patterned structure on the bonding surface (506). At step (405), an upper layer substrate (504) is applied to the predefined patterned structure. At step (406), a bonding process is performed such that the predefined patterned structure forms a hermetic seal between the silicon substrate (503) and the upper layer substrate (504), defining a cavity between the silicon substrate (503) and the upper layer substrate (504) to contain a light modulating material (104).

38 Claims, 7 Drawing Sheets

METHOD OF FORMING A SPATIAL LIGHT MODULATOR

FIELD OF THE INVENTION

The present application relates to spatial light modulator devices and in particular to liquid crystal devices.

Embodiments of the present invention are particularly adapted for methods of forming a Liquid Crystal on Silicon (LCOS) microdisplay device. However, it will be appreciated that the invention is applicable in broader contexts and other applications beyond liquid crystal displays.

BACKGROUND

LCOS microdisplays are reflective devices that use a backplane such as a silicon backplane to reflect and manipulate light. They find applications in consumer devices such as high definition screens and also in optical communications such as optical phase modulators for optical switches.

Manufacturing of these microdisplays requires bonding an upper transparent glass layer onto a reflective or non-reflective silicon backplane or substrate. This bonding process typically involves applying a mixture of adhesive material and spacer elements to form a gasket/seal between the layers. This seal is applied to the silicon backplane to bond the backplane to the upper transparent glass layer to contain the liquid crystal material.

The mixture requires spacer elements, typically in the form of spherical spacer balls or microspheres, to maintain a constant spacing between the layers. However, these spacer elements are formed of a hard material such as plastics or glass and can damage the sensitive silicon backplane. Furthermore, the process of dispensing the mixture must be done on a device-per-device basis, which limits the speed of manufacturing.

The mixture is also known to absorb moisture which has been known to modify the thickness and uniformity of the gasket. This will change the optical performance of the cell and is noticeable in sensitive applications such as optical phase modulators.

Any discussion of the background art throughout the specification should in no way be considered as an admission that such art is widely known or forms part of common general knowledge in the field.

SUMMARY OF THE INVENTION

In accordance with a first aspect of the present disclosure, there is provided a method of forming a spatial light modulator device, the method comprising:
  providing a planar silicon substrate;
  depositing a patternable material onto a bonding surface of the silicon substrate;
  forming the patternable material into a predefined patterned structure on the bonding surface;
  applying an upper layer substrate to the predefined patterned structure; and
  performing a bonding process such that the predefined patterned structure forms a hermetic seal between the silicon substrate and the upper layer substrate, defining a cavity between the silicon substrate and the upper layer substrate to contain a light modulating material.

In some embodiments, the patternable material comprises a photosensitive patternable material. In some embodiments, the photosensitive patternable material comprises a photoresist material.

In some embodiments, the step of depositing the photosensitive patternable material comprises spin coating a layer of the photosensitive patternable material onto the bonding surface.

In some embodiments, the step of depositing the photosensitive patternable material comprises spray coating a layer of the photosensitive patternable material onto the bonding surface.

In some embodiments, the step of depositing the photosensitive patternable material comprises rolling a layer of the photosensitive patternable material onto the bonding surface.

In some embodiments, the steps of depositing the patternable material and forming the predefined patterned structure comprise ink jetting the patternable material onto the bonding surface at predefined locations to form the predefined patterned structure.

In some embodiments, the patternable material is an adhesive material. In other embodiments, the patternable material is a non-adhesive material.

In some embodiments, the steps of depositing the patternable material and forming the predefined patterned structure include 3D printing the patternable material onto the bonding surface at predefined locations to form the predefined patterned structure.

In some embodiments, the patternable material is a non-adhesive material. In other embodiments, the patternable material is an adhesive material.

In some embodiments, the method further comprises the steps of:
  depositing a metallic thin film onto the predefined patterned structure and exposed silicon substrate; and
  performing a lift-off process to remove the predefined patterned structure and metallic thin film attached to the predefined patterned structure, leaving the metallic thin film attached directly to the exposed silicon substrate.

In some embodiments, the predefined patterned structure is in the form of a negative or inverse of a shape of the hermetic seal.

In some embodiments, the steps of depositing the patternable material and forming the predefined patterned structure comprise screen printing the patternable material onto the bonding surface at predefined locations to form the predefined patterned structure.

In some embodiments, the step of performing a bonding process comprises exposing the predefined patterned structure to a heat source under pressure to perform a fusion bond process between the silicon substrate and upper layer substrate.

In some embodiments, the step of performing a bonding process comprises irradiating the predefined patterned structure with ultraviolet radiation to form an adhesive bond between the silicon substrate and upper layer substrate.

In some embodiments, the step of performing a bonding process comprises irradiating the predefined patterned structure with laser light at an interface between the upper layer substrate and the predefined patterned structure.

In some embodiments, the step of performing a bonding process comprises irradiating the predefined patterned structure with infrared radiation to perform a soldering process.

In some embodiments, the method further comprises the step of cleaning the bonding surface of the silicon substrate prior to depositing the patternable material.

In some embodiments, the method further comprises the step of depositing light modulating material onto the silicon substrate within the predefined patterned structure prior to applying the upper layer substrate.

In some embodiments, the predefined patterned structure includes an opening such that a light modulating material can be added after the upper layer substrate has been applied.

In some embodiments, the patternable material comprises two or more constituent materials. A first one of the two or more constituent materials may comprise properties to define a gasket height. A second one of the two or more constituent materials may comprise properties to define the hermetic seal between the silicon substrate and the upper layer substrate. In some embodiments, one of the two or more constituent materials is adhesive so as to adhere the patternable material to the bonding surface.

In some embodiments, the spatial light modulator device is a Liquid Crystal on Silicon (LCOS) device.

In some embodiments, the patternable material is a homogeneous material.

In some embodiments, the patternable material is absent of spacer elements.

In some embodiments, the predefined patterned structure is rectangular. In other embodiments, the predefined patterned structure is non-rectangular.

In accordance with a second aspect of the present disclosure, there is provided a liquid crystal microdisplay device formed by the method of the first aspect.

In accordance with a third aspect of the present disclosure, there is provided a spatial light modulator device comprising:
- a lower substrate;
- an upper substrate;
- an active light modulation material disposed between the lower and upper substrates; and
- a gasket material disposed between the lower and upper substrates and substantially surrounding the active light modulation material to seal the material between the lower and upper substrates;
- wherein the gasket material is a substantially homogeneous material containing no hard spacer elements.

BRIEF DESCRIPTION OF THE FIGURES

Example embodiments of the disclosure will now be described, by way of example only, with reference to the accompanying drawings in which.

DESCRIPTION OF THE INVENTION

Embodiments of the present disclosure will be described with reference to liquid crystal spatial light modulator devices. However, it will be appreciated that the disclosure is applicable to other spatial light modulator devices which incorporate light modulation materials besides liquid crystals.

Device Overview

Figure 1:
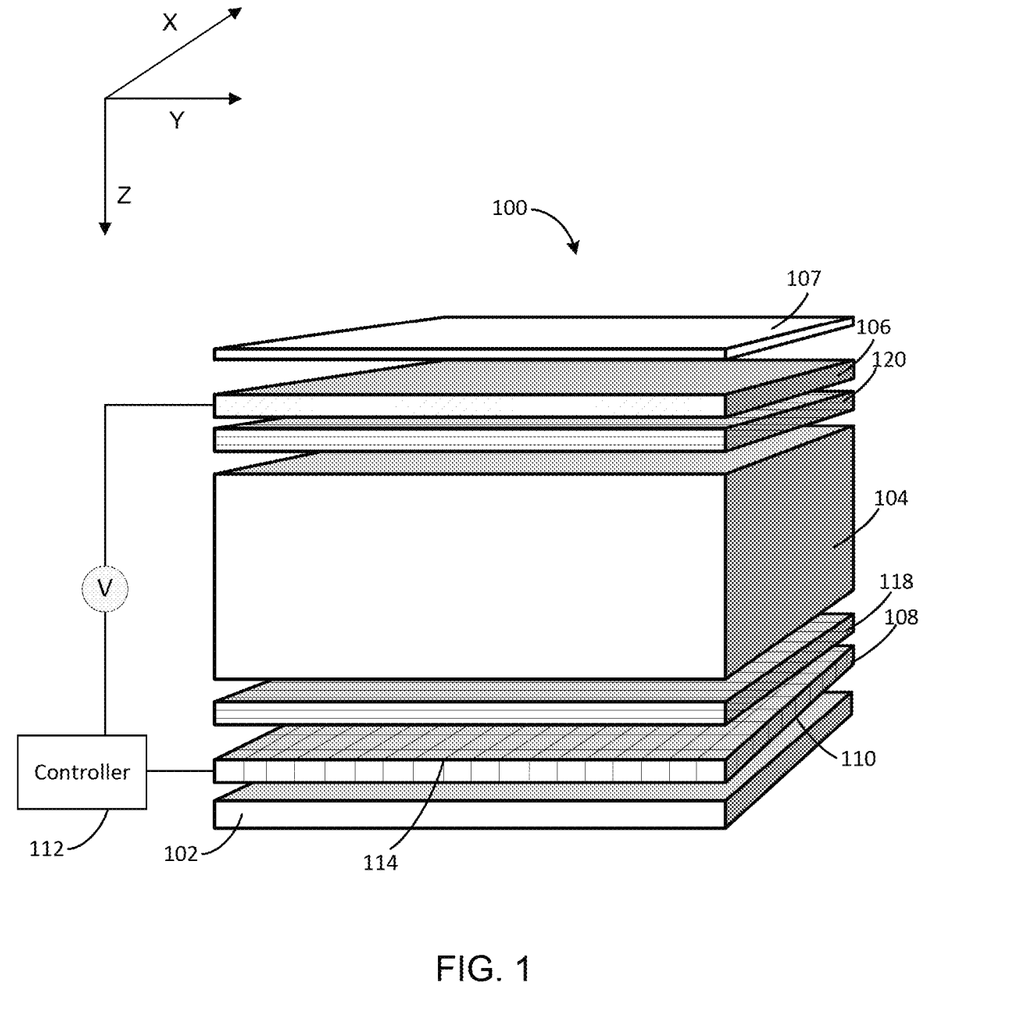
FIG. 1 is an exploded perspective sectional view of an LCOS device.

Referring initially to FIG. 1, there is illustrated a liquid crystal on silicon (LCOS) device 100 which may be used as a spatial light modulator such as in a microdisplay. Device 100 may also be referred to as an LCOS optical phase modulator as it modulates the phase and/or amplitude of an incident optical signal propagating in a propagation dimension (z dimension). Device 100 comprises a silicon substrate 102 and a liquid crystal material layer 104 disposed between a pair of opposing electrodes 106 and 108. Here, the liquid crystals within layer 104 represent a light modulating material. An upper electrode 106 is disposed above liquid crystal layer 104 and a lower electrode 108 is mounted to the silicon substrate 102. Electrode 106 is mounted to an upper transparent glass layer 107. Lower electrode 108 includes a two dimensional array 110 of independently electrically controllable pixels extending in both a first (x) and second (y) lateral dimension across the device 100. Liquid crystal layer 104 is configured to be electrically controllable into a plurality of electrical states by voltage drive signals provided to lower electrode 108 by an electrical controller 112.

Upper electrode 106 is formed of transparent or partially transparent indium-tin-oxide or other at least partially transparent conductive oxides and allows the transmission of the optical signal into and out of device 100. Lower electrode 108 is reflective and includes array 110 of individually controllable aluminum pixels (e.g. 114). The pixels of electrode 108 are electrically driven by supplying an electric potential (V) across the liquid crystal layer 104 between upper and lower electrodes 106 and 108 to drive the local liquid crystals within layer 104 in a predetermined configuration. Each pixel in array 110 is individually drivable by electrical controller 112 at one of a number of predetermined voltage levels to provide a local phase modulation to an incident optical signal. Electrical control of the pixels is provided by interconnections to electrical controller 112 through silicon substrate 102.

Pre-alignment of the liquid crystal materials within layer 104 may be provided by alignment layers 118 and 120. Layers 118 and 120 include a plurality of small grooves aligned along a predetermined direction to define the slow axis of the liquid crystal material.

Figure 2:
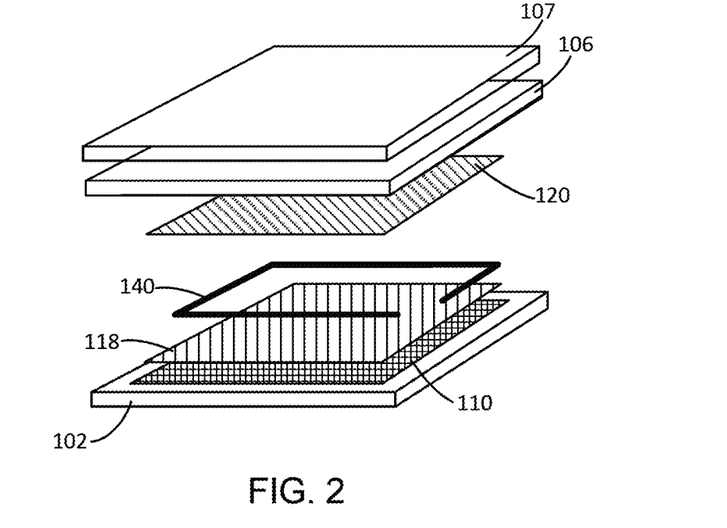
FIG. 2 is an exploded perspective view of an LCOS device illustrating a seal/gasket layer between an upper and lower substrate of the device.

Referring now to FIG. 2, in conventional LCOS devices layers 118 and 120 are sealed together to encapsulate liquid crystal layer 104 using a gasket/seal 140. In this figure, the liquid crystal material is not shown. A gap in gasket/seal 140 is illustrated as the liquid crystal material may be added through this gap prior to final sealing of the layers. However, in some embodiments, the liquid crystal filling occurs prior to sealing between layers 118 and 120. In these embodiments, a gap in the gasket/seal 140 may not be required. In other embodiments, liquid crystal layer 104 is sealed between upper electrode 106 or upper transparent glass layer 107 and lower electrode 108 or substrate 102 with a gasket/seal 140.

Figure 3:
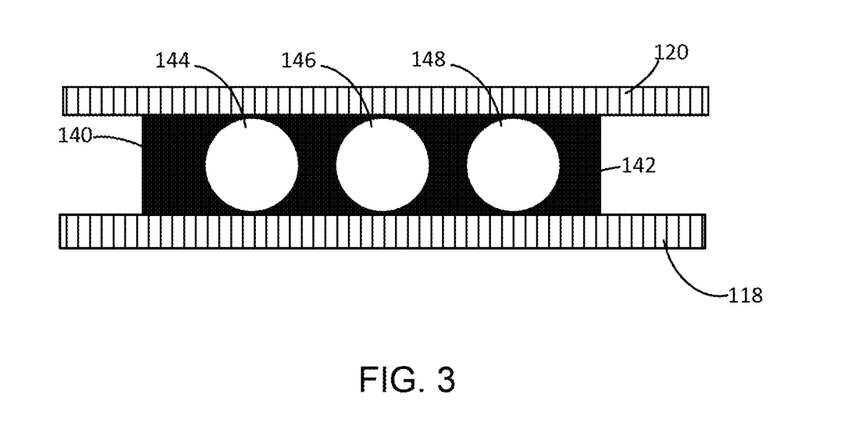
FIG. 3 is a side view of a conventional seal or gasket for an LCOS device containing spherical spacer elements.

FIG. 3 illustrates a close-up side view of a portion of conventional gasket/seal 140, which is formed of a mixture of adhesive material 142 and spacer elements 144, 146 and 148. Although illustrated as being formed on alignment layers 118 and 120, it will be appreciated that gasket/seal 140 may be formed on other layers such as between substrate 102 or lower electrode 108 and upper transparent glass layer 107 or upper electrode 106. Spacer elements 144, 146 and 148 may be spherical, cylindrical or other shaped and are preferably formed of a hard material such as plastics, silica, or another conductive or non-conductive material that is inert to the liquid crystal material. Spacer elements are used to maintain a uniform gap or cell thickness between the two glass substrates that sandwich the liquid crystal material. The thickness of this gap is typically on the order of a few micrometers (μm). The uniformity of this gap is important for the proper functioning of the device. If the gap is not uniform, it can result in variations in the electric field across the liquid crystal layer, which can lead to non-uniform optical properties and degrade the quality of the image. However, as mentioned above, the introduction of hard spacer elements can damage the sensitive silicon backplane. Thus, the invention seeks to reduce or entirely remove the need for spacer elements while maintaining gasket height/spacing.

Although only three spacer elements are illustrated, these elements are distributed throughout gasket/seal 140 to provide reinforcement to the adhesive material 142 and maintain a fixed spacing between elements 118 and 120 (or between other elements in device 100) to contain liquid crystal material 104.

Embodiments of the present invention will be described with reference to an LCOS microdisplay device. However, it will be appreciated that the invention is also applicable to other types of microdisplay devices.

Fabrication Method

Figure 4:
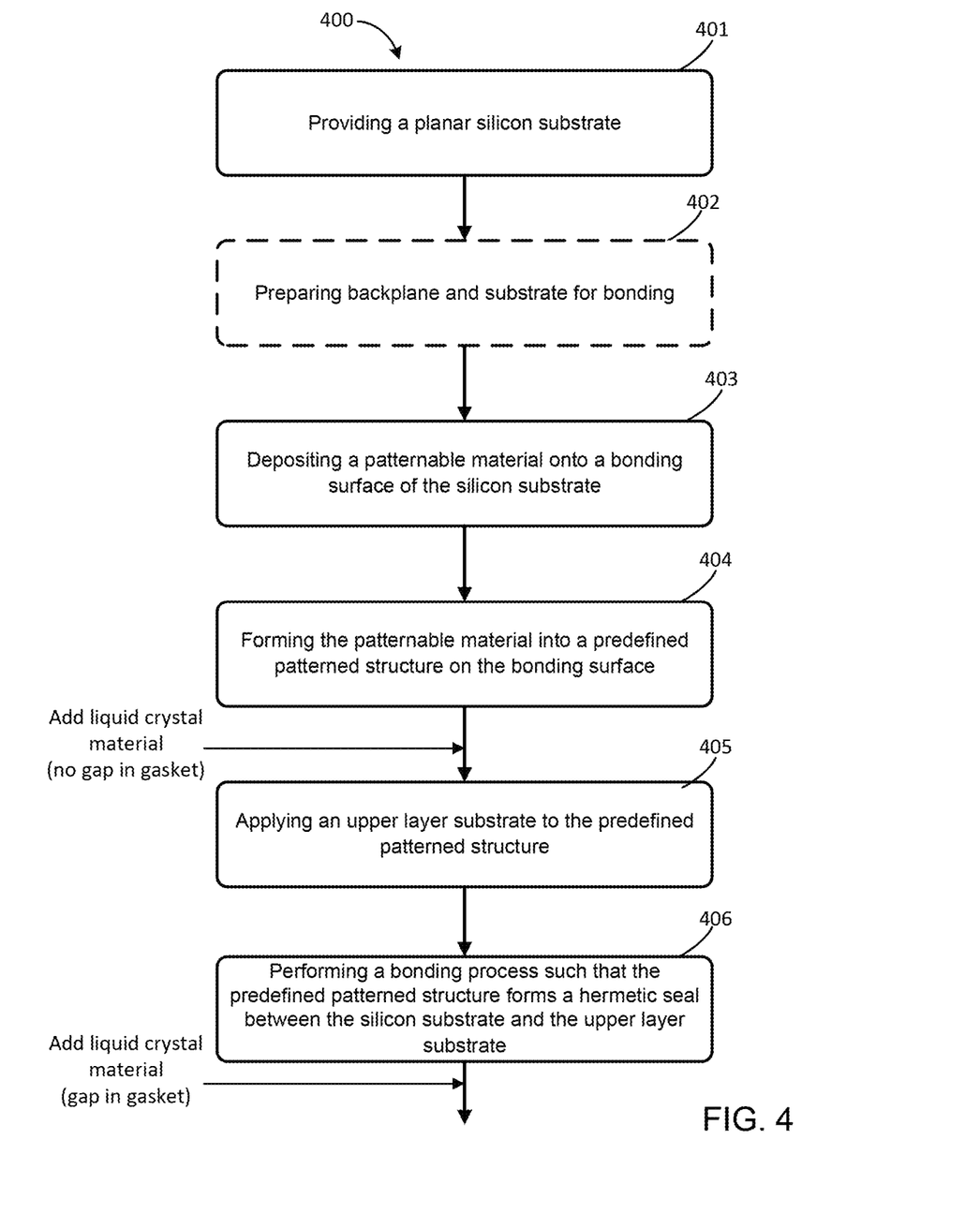
FIG. 4 is a process flow diagram illustrating the primary steps in a method of forming a liquid crystal microdisplay device.
Figure 5:
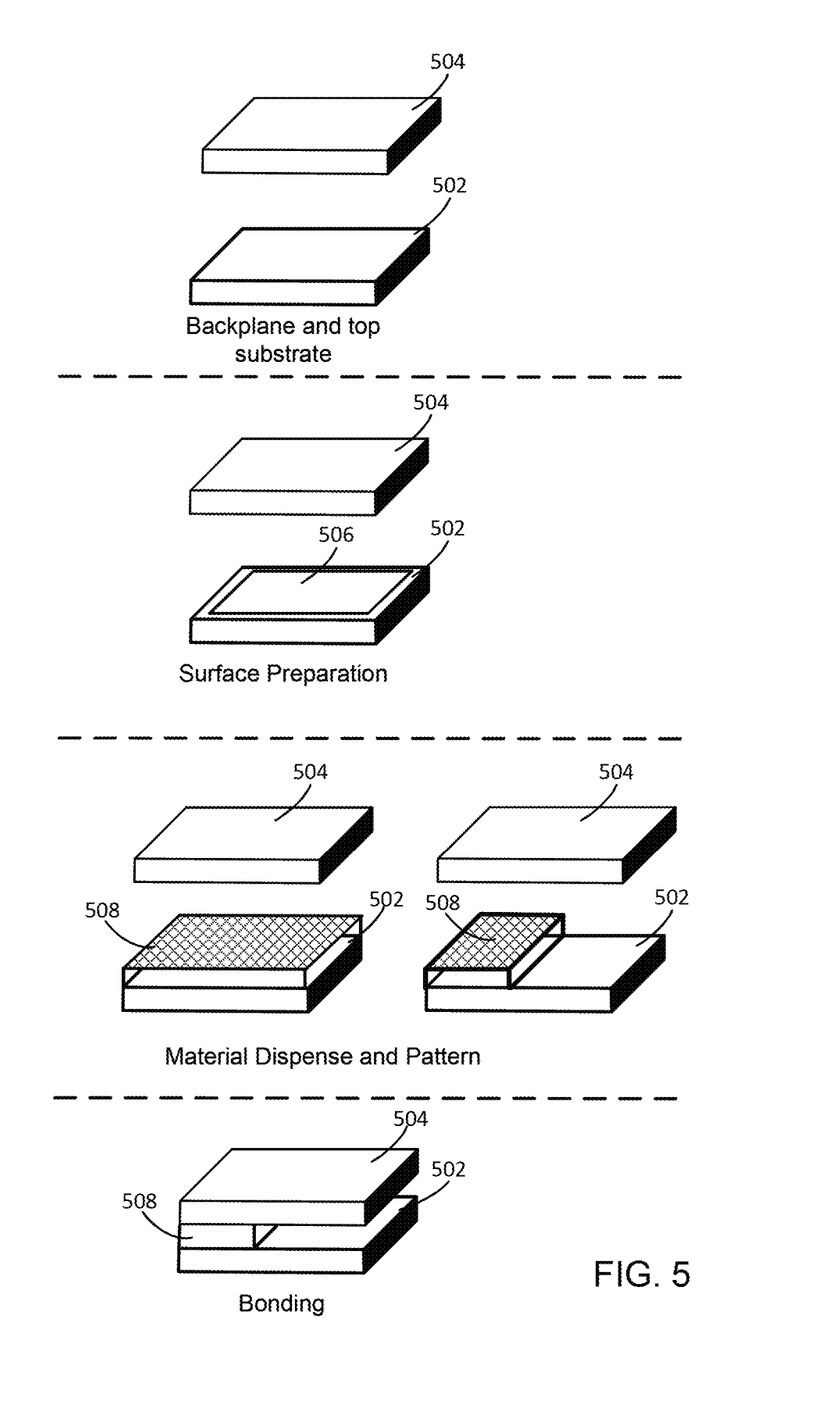
FIG. 5 is a schematic diagram illustrating different processing stages of forming a liquid crystal microdisplay device.

Referring now to FIG. 4, there is illustrated a method 400 of forming a liquid crystal microdisplay device such as an LCOS device. By implementing method 400, the use of spacer elements in the fabrication process can be reduced or avoided entirely. The steps of method 400 will be described with reference to FIG. 5, which schematically illustrates processing stages of the fabrication of the microdisplay device. In FIG. 5, silicon substrate 502 may also be called a backplane and collectively refers to layers 102, 108, and 118 of FIG. 1 and a top substrate 504 collectively refers to 106, 107 and 120 of FIG. 1.

At initial step 401, a silicon substrate 502 is provided. Substrate 502 forms a backplane of the device. In some embodiments, substrate 502 is pre-cleaned and prepared for a subsequent bonding process to have a bonding surface 506 as illustrated in FIG. 5. Bonding surface 506 is formed across an area of substrate 502 where top substrate 504 is to be bonded together with substrate 502.

Where substrate 502 has not been cleaned and prepared for bonding, at optional step 402, an initial substrate preparation process is performed. This includes preparing substrate 502 and upper substrate 504 for bonding. Step 402 may include cleaning of the bonding surface 506, surface activation if necessary and pre-coating of alignment layers. A polyimide coat may be added to substrate 502 or on bonding surface 506, which provides chemical and thermal stability as well as electrical isolation. The polyimide layer may form the alignment layer 118. An initial baking process may also be performed during this initial process. This initial process at step 402 aides proper adhesion of the gasket to the substrates. The cleaning process may involve chemical cleaning such as using detergents and/or may include plasma cleaning. A similar process may be applied to a bonding surface on upper substrate 504.

During or prior to step 402, lower alignment layer 118 is applied to substrate 502. Similarly, upper alignment layer 120 is applied to top substrate 504 at an appropriate time before a liquid crystal material is added to the device.

At step 403, a patternable material 508 is deposited onto bonding surface 506 of the silicon substrate 502. In some embodiments, this includes bakes of the material where necessary. A patternable material refers to any substance that can be manipulated, dispensed or altered to create a specific pattern or design with predefined thickness (in the z direction of FIG. 1). The patternable material must have properties such that, in a stable or operable state (e.g. cured), it is able to maintain its structure and thickness to a high degree of accuracy and to withstand pressure from upper electrode 106 or alignment layer 120 that is bonded thereto. Thus, the patternable material has sufficient strength and hermiticity properties to negate the need for hard spacer elements. Additional properties with respect to the material properties suitable for sealing are discussed above with respect to the discussion of patternable material 508. The patternable material can have its physical or chemical properties changed in a controlled way to produce a desired pattern through processes such as photolithography, etching, or deposition. Preferably, patternable material 508 is a substantially homogeneous material. In particular, patternable material 508 is preferably absent of hard materials such as spacer elements.

In some embodiments, patternable material 508 comprises a polymer. In other embodiments, patternable material 508 may comprise a metal material that is able to be dispensed in liquid form.

Preferably, the patternable material 508 is capable of achieving the following four requirements:
1) Patternable into gasket-like structures;
2) Able to be manipulated to accurately define a gasket height;
3) Provide a hermetic seal; and
4) Be adhering/bondable to other materials.

In some embodiments, patternable material 508 may comprise two or more constituent materials. Where patternable material 508 comprises more than one constituent material, each of the constituent materials may be responsible for achieving a subset of the above four requirements such that, in combination, the sum of the constituent materials forming patternable material 508 collectively provide the above four requirements. When patternable material 508 comprises more than one constituent material, the resulting gasket/seal 140 is also formed of more than one constituent material. This is illustrated schematically in FIG. 8 and described below.

In FIGS. 2, 3, 6 and 7, the patternable material 508 and subsequent gasket/seal 140 is illustrated as being inset from outer edges of substrate 102 and glass layer 107. However, it will be appreciated that, in some embodiments, patternable material 508 and subsequent gasket/seal 140 may be disposed close to or flush with the outer edges of substrate 102 and glass layer 107.

As mentioned below, in some embodiments, patternable material 508 may comprise a photosensitive patternable material. In some embodiments, the photosensitive patternable material comprises a photoresist material designed to be rigid and forming part of the final structures permanently, differ to typical photoresist material designed to be temporary and can be removed with solvents. In one example, such patternable material includes SU-8 or derivatives thereof. SU-8 is an epoxy-based negative photoresist available from Kayaku Advanced Materials of Westborough, MA or Gersteltec Engineering Solutions (https://www.gersteltec.ch/). Different patternable materials may have different tradeoffs between its patternability, its rigidity, its bonding capability, and its ability to hermetic seal. As such, some structures may require more rigidity, but less hermitic sealing, etc. For example SU-8 has a higher rigidity than conventional photoresists. Further, as another example, SU-8 can have differing viscosities (e.g., SU-8 2-25 or SU-8 50-100). A higher viscosity formulation during application may be utilized to achieve a thicker structure after it is rendered permanent. Photoresists are typically a type of polymer, which can be applied to a surface and then selectively exposed to light (usually ultraviolet light). This light exposure causes a chemical change in the photoresist, depending on the type of photoresist used. The photoresist may be a positive photoresist or a negative photoresist. When a positive photoresist is exposed to UV or other light, the exposed material becomes soluble and is therefore removed by a developer solution, while the unexposed areas remain on the substrate. Conversely, a negative photoresist becomes insoluble when exposed to UV or other light, and the unexposed areas may be washed off by the developer solution Where patternable material 508 comprises permanent patternable material and more than one constituent material, patternable material 508 may comprise:

A first permanent patternable material that is adapted to a) form a patternable gasket-like structure; b) provide gasket height defining; and c) be adhering/bondable to other materials.

A second material, that is not permanent patternable material, that is dispensed such that it surrounds and conforms to the first material to create a hybrid structure that provides a hermetic seal.

When providing a hermetic seal, the second material (and/or combined permanent patternable material) can, in one example, have a water vapor transmission rate (WVTR), for example in accordance with ASTM F1249, less than 5 gram per square meter per day at 60 degrees Celsius and 90 percent room humidity with a thickness of 500 microns. In another example, the second material (and/or combined permanent patternable material) has a water vapor transmission rate (WVTR) less than 1 gram per square meter per day at 60 degrees Celsius and 90 percent room humidity with a thickness of 500 microns.

In another example, the second material (and/or combined permanent patternable material) has a boiling water absorption less than 3 percent by weight when submerged in boiling water for 2 hours or, alternatively, less than 1 percent by weight when submerged in boiling water for 2 hours. An example boiling water absorption standard is ASTM D570.

In another example, the second material (and/or combined permanent patternable material) has room temperature water absorption less than 1 percent by weight, or alternatively less than 0.1 percent by weight, when submerged in 25 degrees Celsius water for 24 hours. An example room temperature water absorption standard is ASTM D570.

Patternable material 508 preferably comprises an adhesive material but may comprise a material that only becomes adhesive after processing such as baking. As such, patternable material 508 may initially comprise a non-adhesive material.

The deposition process of step 403 may comprise various different deposition processes depending on the application and specific patternable material to be used. In some embodiments, where patternable material 508 is photosensitive, deposition step 403 comprises spin coating a layer of the photosensitive patternable material onto the bonding surface. Spin coating is a procedure used to apply uniform thin films to flat substrates using centrifugal force. Typically, an excess amount of a solution is placed in a central position on the substrate, which is secured on a rotatable mount, and then rotated at high speed in order to spread the fluid by centrifugal force. Excess material is thrown off the edge of the rotating substrate, leaving a substantially uniform thin film on the surface.

In other embodiments where patternable material 508 is photosensitive, deposition step 403 comprises spray coating a layer of the photosensitive patternable material onto bonding surface 506. Spray coating involves spraying patternable material 508 in a spray form directly onto bonding surface 506 using a spray head which atomizes the material into fine droplets.

Where the patternable material is photosensitive, the deposition step 402 may comprise rolling a layer of the photosensitive patternable material onto bonding surface 506. This process may comprise rolling deposition wherein a roll of patternable material 508 is selectively rolled onto bonding surface 506. This process can be performed accurately and at high speed with the use of a robotic deposition system. An example of this is in a flexographic printing process.

Figure 6A:
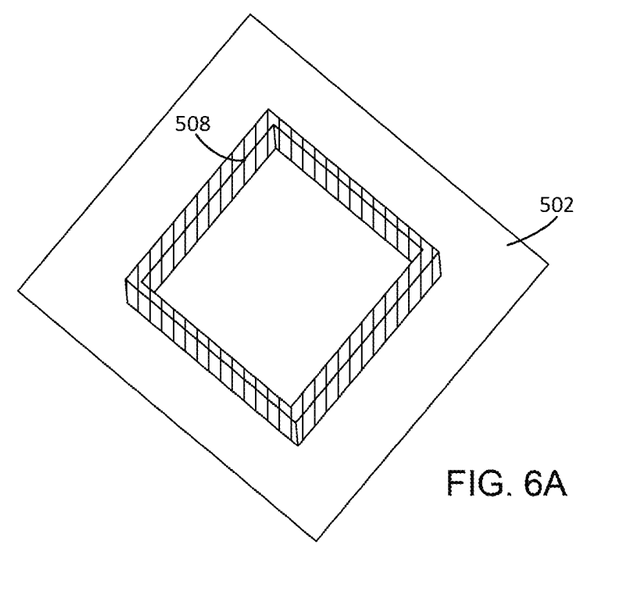
FIG. 6A is an elevated perspective view of a first patterned structure forming a gasket deposited on a substrate during the process of forming a liquid crystal microdisplay device.
Figure 6B:
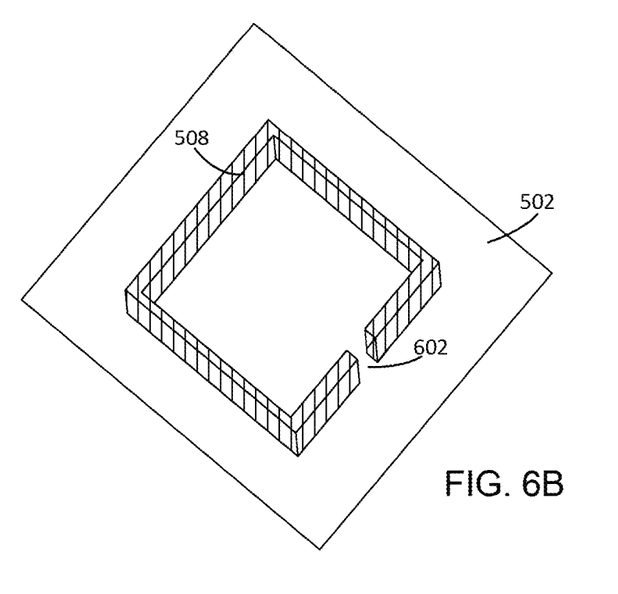
FIG. 6B is an elevated perspective view of a second patterned structure forming a gasket deposited on a substrate during the process of forming a liquid crystal microdisplay device.

At step 404, patternable material 508 is formed into a predefined patterned structure on bonding surface 506. Example patterned structures are illustrated in FIG. 6. This patterning process may comprise various processes as outlined below. The predefined patterned structure may comprise the end desired structure for forming the gasket/seal on the device. By way of example, this may comprise a circumferentially extending seal such as that illustrated in FIG. 2. Alternatively, the predefined patterned structure may comprise a negative or inverse pattern of the end desired structure for forming the gasket/seal on the device. For example, the predefined patterned structure may be in the form of a negative of a shape of the hermetic seal to be made. This is particularly possible when using a photoresist patternable material.

Where the patternable material 508 comprises a photoresist, a photoresist etching or developing process may be performed at step 404. Once the photoresist is deposited onto substrate 102, the photoresist is then exposed to a source of light (often ultraviolet), through a mask that carries the desired predefined patterned structure. The light causes chemical changes in the exposed areas of the photoresist. After exposure, the photoresist is developed. This involves immersing the substrate in a solution that dissolves either the exposed or unexposed areas of the photoresist, depending on whether a positive or negative photoresist was used. The result is a relief image of the mask pattern in the photoresist.

In some embodiments, deposition step 403 and patterning step 404 are performed in conjunction with one another as a single step. By way of example, steps 403 and 404 may collectively comprise ink jetting patternable material 508 onto bonding surface 506 at predefined locations to form the predefined patterned structure. During inkjet deposition, patternable material 508 is deposited directly onto bonding surface 506 from a printing head in the desired patterned structure and no separate patterning process is required.

Similarly, in other embodiments, steps 403 and 404 collectively comprise 3D printing patternable material 508 onto bonding surface 506 at predefined locations to form the predefined patterned structure. In some embodiments, patternable material 508 is formed on bonding surface 506 through an additive manufacturing process to directly form the predefined patterned structure. In other embodiments, a layer of patternable material 508 is first deposited on bonding surface 506 and a subtractive 3D printing process such as etching is used to selective remove sections of the layer to form the predefined patterned structure.

Where patternable material 508 comprises multiple constituent materials, an inkjet or 3D printing process may comprise:
- A first material adapted to a) form a patternable gasket-like structure (the 3D printing process performs the patterning); and b) provide gasket height defining.
- A second material that is dispensed such that it surrounds and conforms to the first material and a) provides a hermetic seal; and b) is adhering/bondable to other materials.

Both inkjet and 3D printing processes can be used to create adhesive/non-adhesive predefined patterned structures. For example, both inkjet and 3D printing processes can print height defining gasket structures (however not adhesive). Further, both inkjet and 3D printing process can also print adhesive epoxy gasket structures.

Figure 7A:
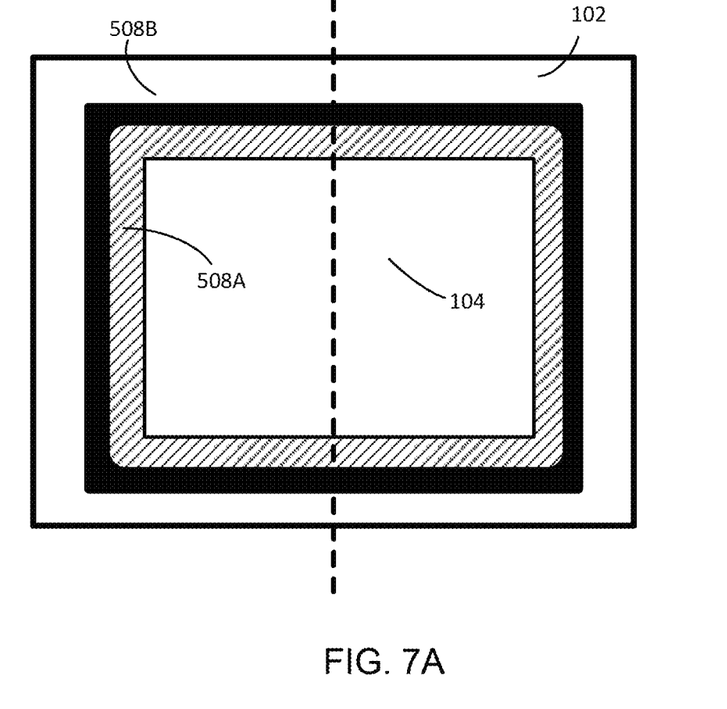
FIG. 7A is a top view of a liquid crystal microdisplay device in which the gasket is formed of a patternable material that comprises two constituent materials.
Figure 7B:
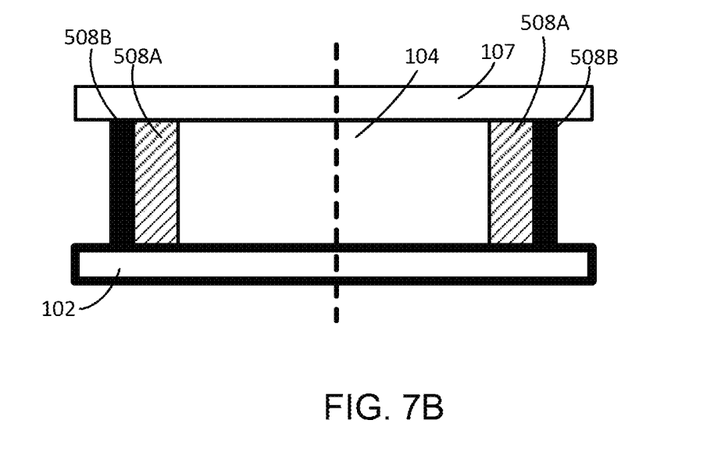
FIG. 7B is a side view of the liquid crystal microdisplay device of FIG. 7A.

FIGS. 7A and 7B schematically illustrate a patternable structure that is formed from a patternable material 508 that comprises two constituent materials 508A and 508B. As illustrated, the dual materials are disposed horizontally side-by-side with respect to each other. Note that, in some embodiments, the locations of the adhesive and sealant materials are able to be swapped. I.e. an adhesive material may be the inner structure/layer (as shown in FIG. 7) or the outer structure/layer. Where the adhesive material comprises permanent patternable material and forms the inner layer while the outer layer is formed from a material with good moisture barrier properties to provide the sealing.

In some embodiments, steps 403 and 404 collectively comprise screen printing patternable material 508 onto bonding surface 506 at predefined locations to form the predefined patterned structure. This process involves first placing a mask or stencil structure over bonding surface 506, which is a negative of the predefined patterned structure. Patternable material 508 is then deposited onto the mask/stencil to fill the voids of the mask/stencil and produce the predefined patterned structure on bonding surface 506. The mask/stencil is then removed.

In some embodiments, additional steps may be performed after steps 403 and 404. For example, after performing deposition step 403, a metal lift-of process is performed wherein a metallic thin film is deposited onto the predefined patterned structure formed by patterned material 508 on surface 506 and exposed silicon substrate 502. The predefined patterned structure may be formed by one of the processes described above such as using a photoresist. Next, a lift-off process can be performed to remove the predefined patterned structure and metallic thin film attached to the predefined patterned structure. This lift-off process is typically performed using a solvent. The metal that was deposited on top of the patterned structure is lifted off along with the patterned structure, leaving the metallic thin film attached directly to the exposed silicon substrate.

Where patternable material 508 comprises a metal material, a metal sintering process may be performed. Initially, the metal patternable material is deposited onto bonding surface 506 to form a layer of patternable material. Next, the metal material is patterned into the desired predefined patterned structure. This patterning may comprise projecting a laser beam onto the patternable material at locations corresponding to the predefined patterned structure. The energy from the laser beam acts to bond the metal material to bonding surface 506 to form the predefined patterned structure. Following this, the remaining unbonded metal material that is not bonded to bonding surface 506 is washed off to retain only the predefined patterned structure which is used to form the gasket.

In each of the processes above, the patternable material 508 is formed such that it has a predefined patterned structure including a predefined thickness and sufficient strength and minimal compressibility so as to support upper layer substrate 504 in operation.

At step 405, upper layer substrate 504 is applied to the predefined patterned structure formed by patternable material 508. In some embodiments, the liquid crystal material 104 is added after step 404 and prior to step 405. This can be performed when the predefined patterned structure includes a complete circumferential structure such as that illustrated in FIG. 6A. Alternatively, as shown in FIG. 6B, a gap 602 may be left in the predefined patterned structure as illustrated in FIG. 6B. This gap 602 allows the liquid crystal material 104 to be added after upper layer substrate 504 has been applied and bonded at step 406 below. After filling with the liquid crystal material 104, the gap is filled in with additional material which is preferably the same material as patternable material 508.

Finally, at step 406, a bonding process is performed such that the predefined patterned structure forms a hermetic seal between silicon substrate 502 and upper layer substrate 504. After bonding, the patternable material itself forms a seal or gasket between silicon substrate 502 and upper substrate 504. This defines a cavity between silicon substrate 502 and upper layer substrate 504 to contain the liquid crystal material 104. In one example, the patternable material has a shear bonding strength to glass and silicon greater than about 10 Newtons per square millimeter ($N/mm^2$) or 10 Megapascals (MPa).

The bonding process used will depend on the material used for patternable material 508. The bonding process may comprise exposing the predefined patterned structure to a heat source under pressure to perform a fusion bond process between silicon substrate 502 and upper layer substrate 504. The bonding process may comprise irradiating the predefined patterned structure with ultraviolet radiation to form an adhesive bond between the silicon substrate and upper layer substrate. The bonding process may comprise irradiating the predefined patterned structure with laser light at an interface between upper layer substrate 502 and the predefined patterned structure. The bonding process may comprise irradiating the predefined patterned structure with infrared radiation to perform a soldering process.

Following the process of method 400, a liquid crystal microdisplay device is formed which enables it to be hermetic and free from damaging spacer material/elements. Method 400 may be performed wholly or in part by an automated fabrication device or system. Such a device or system may be programmed to repeat method 400 on multiple devices to mass produce liquid crystal microdisplay devices.

Figure 8:
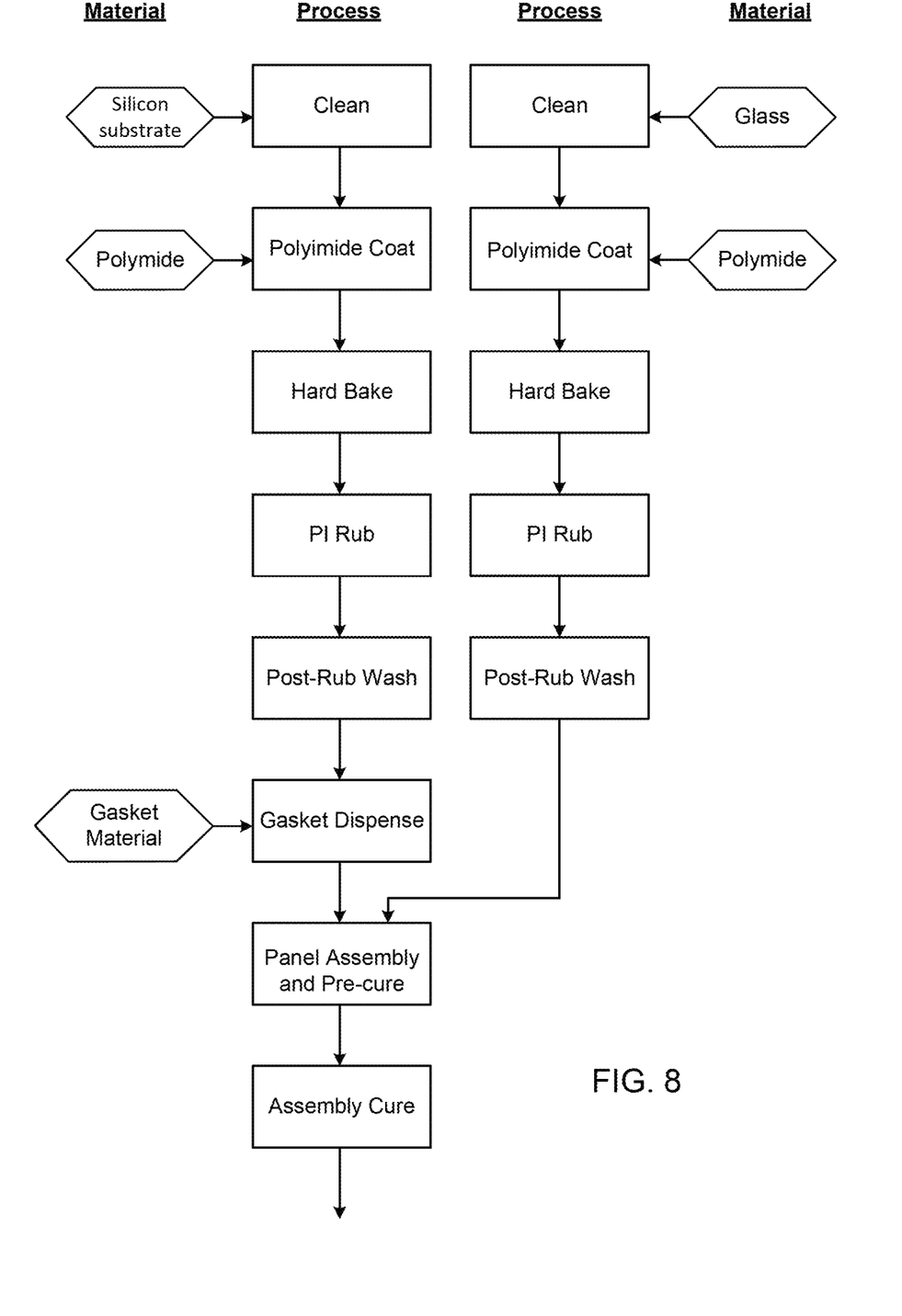
FIG. 8 is a process flow diagram illustrating a specific implementation of the fabrication process and example materials used in the process.

FIG. 8 schematically illustrates a specific implementation of the fabrication process and example materials used in the process. In FIG. 8, the gasket dispensing step corresponds to the deposition of patternable material 508 and subsequent formation of the patterned structure (steps 403 and 404) of method 400. As illustrated, additional steps of washing, baking and curing may be performed in addition to the primary steps of method 400 described above. The PI Rub step in FIG. 8 is to form grooves in alignment layers 118 and 120 to provide pre-alignment of the liquid crystal materials within layer 104.

Advantages of the preferred embodiments of the present disclosure include:
  Improved hermeticity of liquid crystal microdisplay assembly;
  Reduced damage to the sensitive backplane of the display. The disclosed technique uses material and/or technique which enables it to be hermetic and free from potentially damaging spacer materials;
  Higher productivity than conventional processes through the use of standard wafer level semiconductor processes; and
  The ability to print "special" features. In particular, conventional gaskets have a rectangular shape. With the process of the present invention, different and more complex gasket structures can be formed such as additional lines within the frame as an improvement to an LCOS device.

Interpretation

The term "infrared" is used in the description and claims. Within the scope of this specification, infrared refers to the general infrared area of the electromagnetic spectrum which includes near infrared, infrared and far infrared frequencies or light waves.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Embodiments described herein are intended to cover any adaptations or variations of the present invention. Although the present invention has been described and explained in terms of particular exemplary embodiments, one skilled in the art will realize that additional embodiments can be readily envisioned that are within the scope of the present invention.

What is claimed is:

1. A method of forming a spatial light modulator device, the method comprising:
  providing a planar silicon substrate;
  depositing a patternable material onto a bonding surface of the silicon substrate;
  forming the patternable material into a predefined patterned structure on the bonding surface;
  applying an upper layer substrate to the predefined patterned structure; and
  performing a bonding process such that the predefined patterned structure forms a hermetic seal between the silicon substrate and the upper layer substrate, defining a cavity between the silicon substrate and the upper layer substrate to contain a light modulating material, wherein step of performing a bonding process comprises at least one of: irradiating the predefined patterned structure with ultraviolet radiation to form an adhesive bond between the silicon substrate and upper layer substrate; irradiating the predefined patterned structure with laser light at an interface between the upper layer substrate and the predefined patterned structure; irradiating the predefined patterned structure with infrared radiation to perform a soldering process.

2. The method according to claim 1 wherein the steps of depositing the patternable material and forming the predefined patterned structure comprise screen printing the patternable material onto the bonding surface at predefined locations to form the predefined patterned structure.

3. The method according to claim 1 wherein the step of performing a bonding process comprises irradiating the predefined patterned structure with ultraviolet radiation to form an adhesive bond between the silicon substrate and upper layer substrate.

4. The method according to claim 1 wherein the step of performing a bonding process comprises irradiating the predefined patterned structure with laser light at an interface between the upper layer substrate and the predefined patterned structure.

5. The method according to claim 1 wherein the step of performing a bonding process comprises irradiating the predefined patterned structure with infrared radiation to perform a soldering process.

6. A method of forming a spatial light modulator device, the method comprising:
   providing a planar silicon substrate;
   depositing a patternable material onto a bonding surface of the silicon substrate;
   forming the patternable material into a predefined patterned structure on the bonding surface;
   applying an upper layer substrate to the predefined patterned structure; and
performing a bonding process such that the predefined patterned structure forms a hermetic seal between the silicon substrate and the upper layer substrate, defining a cavity between the silicon substrate and the upper layer substrate to contain a light modulating material,
wherein the patternable material comprises a photosensitive patternable material.

7. The method according to claim 6, further comprising exposing the photosensitive patternable material to light to convert the photosensitive patternable material to a permanent patternable material.

8. The method according to claim 7 wherein the photosensitive patternable material has a shrinkage of less than 5 percent by volume (vol. %) when formed into the permanent patternable material.

9. The method according to claim 8 wherein the material has water vapor transmission rate (WVTR) less than 5 gram per square meter per day at 60 degrees Celsius and 90 percent room humidity with a thickness of 500 microns.

10. The method according to claim 8 wherein the material has boiling water absorption less than 3 percent by weight when submerged in boiling water for 2 hours.

11. The method according to claim 8 wherein the material has room temperature water absorption less than 1 percent by weight when submerged in 25 degrees Celsius water for 24 hours.

12. The method according to claim 6 wherein the photosensitive patternable material comprises a photoresist material.

13. The method according to claim 6 wherein the step of depositing the photosensitive patternable material comprises spin coating a layer of the photosensitive patternable material onto the bonding surface.

14. The method according to claim 6 wherein the step of depositing the photosensitive patternable material comprises spray coating a layer of the photosensitive patternable material onto the bonding surface.

15. The method according to claim 6 wherein the step of depositing the photosensitive patternable material comprises rolling a layer of the photosensitive patternable material onto the bonding surface.

16. The method according to claim 6 further comprising the steps of:
   depositing a metallic thin film onto the predefined patterned structure and exposed silicon substrate; and
   performing a lift-off process to remove the predefined patterned structure and metallic thin film attached to the predefined patterned structure, leaving the metallic thin film attached directly to the exposed silicon substrate.

17. The method according to claim 16 wherein the predefined patterned structure is in the form of a negative or inverse of a shape of the hermetic seal.

18. The method according to claim 6 wherein the step of performing a bonding process comprises exposing the predefined patterned structure to a heat source under pressure to perform a fusion bond process between the silicon substrate and upper layer substrate.

19. The method according to claim 6 further comprising the step of cleaning the bonding surface of the silicon substrate prior to depositing the patternable material.

20. The method according to claim 6 further comprising the step of depositing light modulating material onto the silicon substrate within the predefined patterned structure prior to applying the upper layer substrate.

21. The method according to claim 6 wherein the predefined patterned structure includes an opening such that a light modulating material can be added after the upper layer substrate has been applied.

22. The method according to claim 6 wherein the patternable material comprises two or more constituent materials.

23. The method according to claim 22 wherein at least one of the two or more constituent materials comprises properties to define a gasket height.

24. The method according to claim 22 wherein at least one of the two or more constituent materials comprises properties to define the hermetic seal between the silicon substrate and the upper layer substrate.

25. The method according to claim 22 wherein at least one of the two or more constituent materials is adhesive so as to adhere the patternable material to the bonding surface.

26. The method according to claim 25 wherein the patternable material has a shear bonding strength to glass and silicon to be greater than 10 Newton per square millimeter or 10 Megapascals.

27. The method according to claim 6 wherein the spatial light modulator device is a Liquid Crystal on Silicon (LCOS) device.

28. The method according to claim 6 wherein the patternable material is a homogeneous material.

29. The method according to claim 6 wherein the patternable material is absent of spacer elements.

30. The method according to claim 6 wherein the predefined patterned structure is rectangular.

31. The method according to claim 6 wherein the predefined patterned structure is non-rectangular.

32. A liquid crystal microdisplay device formed by the method according to claim 6.

33. A method of forming a spatial light modulator device, the method comprising:
providing a planar silicon substrate;
depositing a patternable material onto a bonding surface of the silicon substrate;
forming the patternable material into a predefined patterned structure on the bonding surface;
applying an upper layer substrate to the predefined patterned structure; and
performing a bonding process such that the predefined patterned structure forms a hermetic seal between the silicon substrate and the upper layer substrate, defining a cavity between the silicon substrate and the upper layer substrate to contain a light modulating material,
wherein the steps of depositing the patternable material and forming the predefined patterned structure comprise ink jetting the patternable material onto the bonding surface at predefined locations to form the predefined patterned structure.

34. The method according to claim 33 wherein the patternable material is an adhesive material.

35. The method according to claim 33 wherein the patternable material is a non-adhesive material.

36. The method according to claim 35 wherein the patternable material is an adhesive material.

37. A method of forming a spatial light modulator device, the method comprising:
providing a planar silicon substrate;
depositing a patternable material onto a bonding surface of the silicon substrate;
forming the patternable material into a predefined patterned structure on the bonding surface;
applying an upper layer substrate to the predefined patterned structure; and
performing a bonding process such that the predefined patterned structure forms a hermetic seal between the silicon substrate and the upper layer substrate, defining a cavity between the silicon substrate and the upper layer substrate to contain a light modulating material,
wherein the steps of depositing the patternable material and forming the predefined patterned structure include 3D printing the patternable material onto the bonding surface at predefined locations to form the predefined patterned structure.

38. The method according to claim 37 wherein the patternable material is a non-adhesive material.

* * * * *